Jan. 31, 1961 W. E. PFEFFER 2,970,267
ELECTRICAL MEASURING INSTRUMENT
Filed May 6, 1959 2 Sheets-Sheet 2
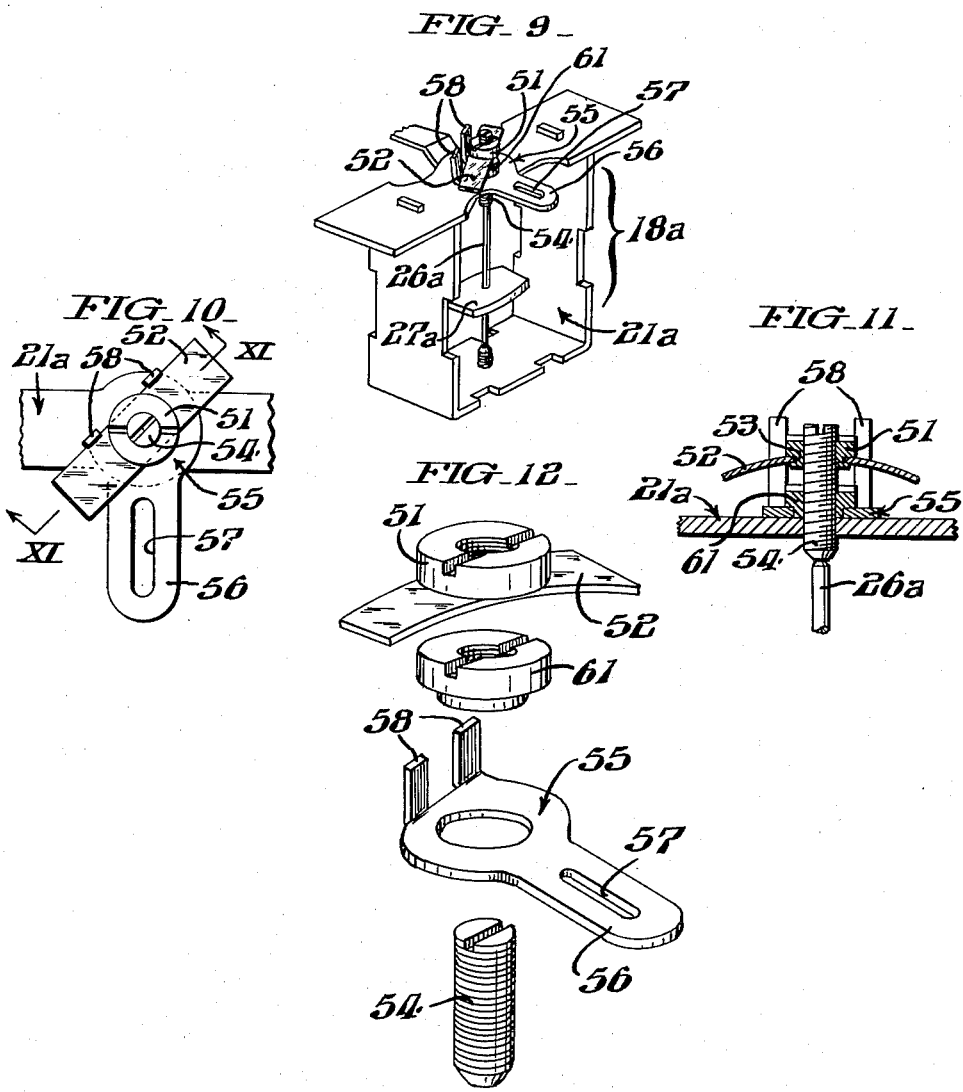
INVENTOR.
William E. Pfeffer,
BY Paul & Paul
ATTORNEYS.

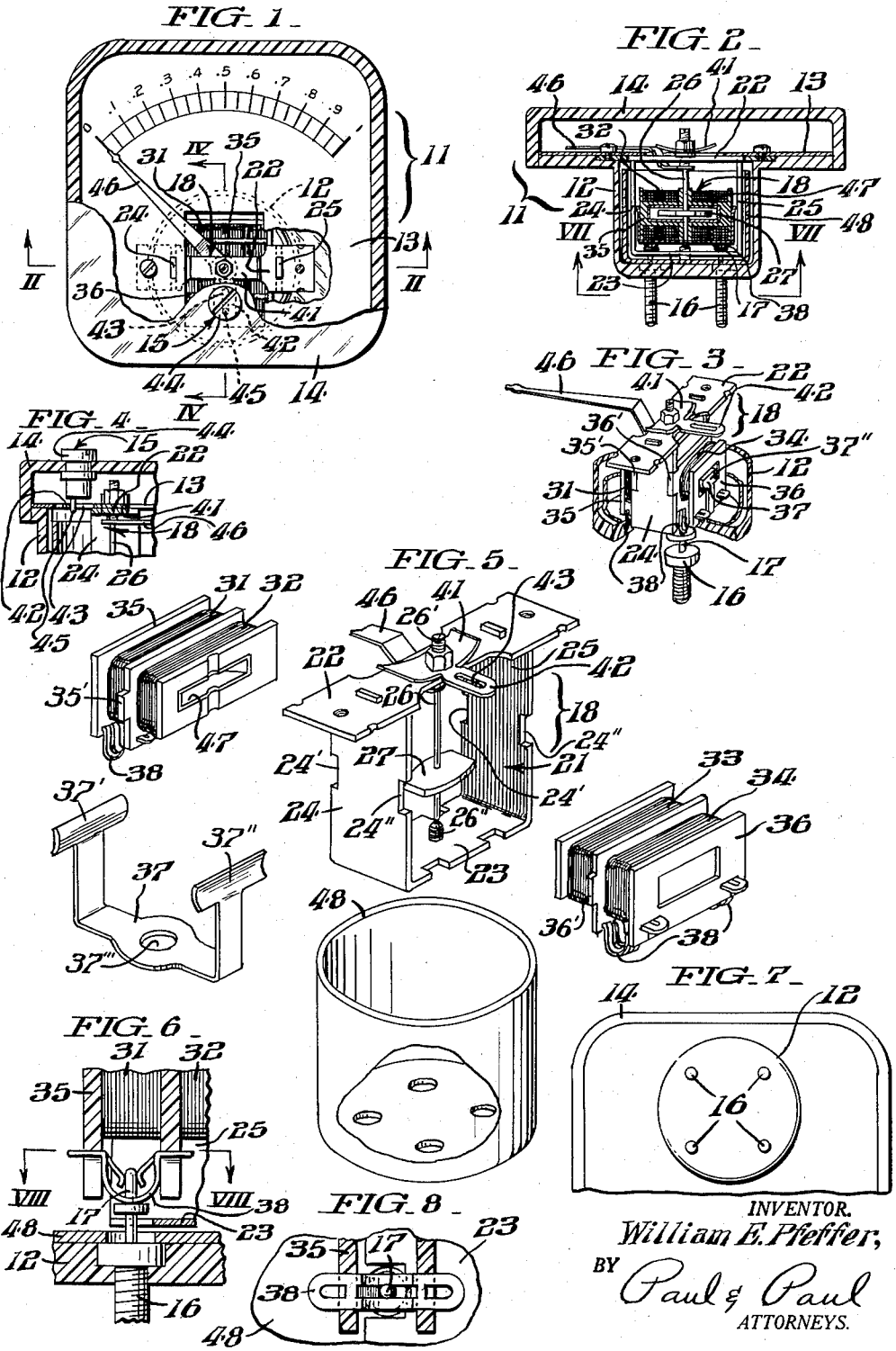

United States Patent Office 2,970,267
Patented Jan. 31, 1961

2,970,267

ELECTRICAL MEASURING INSTRUMENT

William E. Pfeffer, Perkasie, Pa., assignor to The Electro-Mechanical Instrument Company, Perkasie, Pa., a co-partnership Filed May 6, 1959, Ser. No. 811,411

4 Claims. (Cl. 324—146)

This invention relates to improvements in an electrical measuring instrument, and more particularly concerns an electrical measuring instrument having a movement which is an easily replaceable package unit.

It is an object of this invention to provide an electrical measuring instrument which is quickly and easily assembled, and which has a movement which is quickly and easily replaceable as a package unit.

It is another object of this invention to provide means whereby the zero point of the pointer is easily adjusted from outside the instrument.

It is another object of this invention to magnetically shield the movement of the instrument.

It is another object of this invention to provide an instrument of increased sensitivity.

It is another object of this invention to provide means for quickly and easily adjusting the calibration of the instrument.

Other objects and advantages of this invention, including its simplicity and economy, will further become apparent hereinafter and in the drawings, in which:

Fig. 1 is a front view of the electrical measuring instrument constructed in accordance with this invention, with parts being broken away in order to show important details;

Fig. 2 is a view in cross section of the instrument shown in Fig. 1 taken as indicated by the lines and arrows II—II which appear in Fig. 1;

Fig. 3 is a view in perspective of the movement of the instrument of Fig. 1, with parts being broken away in order to show important details;

Fig. 4 is a partial view in section, taken as indicated by the lines and arrows IV—IV which appear in Fig. 1;

Fig. 5 is an exploded view on a larger scale of the movement shown in Fig. 3;

Fig. 6 is a partial view of the quick connect-disconnect electrical connection element of the invention;

Fig. 7 is an end view taken as shown by the lines and arrows VII—VII which appear in Fig. 2;

Fig. 8 is a view in section taken as indicated by the lines and arrows VIII—VIII which appear in Fig. 6;

Fig. 9 is a view in perspective of another embodiment of the electrical measuring instrument constructed in accordance with this invention;

Fig. 10 is a partial view in top plan of the instrument shown in Fig. 9;

Fig. 11 is a view in section taken as indicated by the lines and arrows XI—XI which appear in Fig. 10; and Fig. 12 is an exploded view on a larger scale of the combination zero adjuster and calibration control which forms a part of the instrument of Fig. 9.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown an electrical measuring instrument 11, such as a voltmeter, which includes a casing 12, a dial face 13, a dial face case 14, a zero adjustment mechanism 15, terminal posts 16 with contact pins 17, and movement 18.

Movement 18 includes a movement support bracket 21 having a front member 22, a back member 23, and side members 24 and 25, an arbor 26 of which the top and bottom ends are engaged in bearings screws 26' and 26" threaded into front member 22 and back member 23, and a permanent magnet 27 which is mounted on arbor 26 and is rotatable therewith. Electrical coils 31 through 34 are mounted on axially hollow insulating blocks 35, 36 having lateral lugs 35' and 36' engaged in notches 24', 24" in the side edges of the support bracket 21. The blocks 35 and 36 are held in place in the assembly by a U-shaped spring 37 having cross portions 37' and 37" at the top of its side arms engaged into the hollows of said blocks and an aperture 37''' centrally of the bottom to clear the arbor bearing screw 26". Coils 31 through 34 are electrically connected together and terminate in spring clip jacks 38 which are adapted to receive the pins 17 of terminal posts 16.

Mounted on the front member 22 of support bracket 21 is a bendable restoring magnet 41 which is used to calibrate the instrument 11. Extending from restoring magnet 41 is a tongue 42 having a slot 43 formed therein which forms a part of the zero adjustment mechanism 15. Rotatably mounted in dial face case 14 is a zero adjustment actuating member 44 (Figs. 1 and 4) which has depending therefrom a pin 45 which is received by the slot 43. Rotation of actuating member 44 causes rotation of tongue 42 and restoring magnet 41 to adjust the zero point of a pointer 46. Bending the restoring magnet 41 changes the restraining magnet force exerted by 41 on the arbor magnet 27 and thereby provides for accurate calibration of the instrument.

Also provided in movement 18 are the copper damping cups 47 (Fig. 2) which are positioned within a chamber formed in insulating blocks 35, 36 and which exert a retarding force on arbor magnet 27 to prevent overswing and chatter of pointer 46.

A magnetic shield cup 48, which is made of a high permeability magnetic material, is provided for shielding movement 18 from adverse magnetic influences.

In operation, electrical measuring instrument 11 is connected in an electrical circuit which activates coils 31 through 34 to cause rotation of permanent arbor magnet 27 and pointer 46 across the dial face 13 of the instrument and the quantities to be measured are read from the scale provided on dial face 13.

To adjust the zero point of instrument 11, zero adjustment actuating member 44 is rotated by means of a screwdriver until pointer 46 points to the zero indication on the scale. This is done very easily and simply, and the adjustment is made from outside instrument 11 with no necessity for removing movement 18, or dial face 13, or even dial face case 14.

To adjust the calibration of the instrument 11, dial face cover 14 is removed and restoring magnet 14 is bent into the desired position.

The ease of assembly of movement 18 is to be particularly noted. Insulating blocks 35, 36 are held together by the holding spring 37, and the entire movement 18 is mounted within casing 12 by merely placing it therein with electrical contact being made very quickly and easily between pins 17 and spring clip jacks 38. This construction makes for ease of assembly and replacement of movement 18.

The combined restoring magnet 41 and tongue 42 which forms part of the zero adjustment mechanism 15 provides an economy in manufacture which is highly desirable.

It is to be noted that there are four electrical coils 31 through 34 provided, with two coils on each side of magnet 27. These coils have been shaped not only to fit in the magnetic shield cup 48, but also to reduce the average length per turn as much as possible, thereby reducing the total resistance of the coil as compared to what it would be if it had been of the standard rectangular form. This has resulted in increased sensitivity of measuring instrument 11 since it has a resistance of only 100 ohms instead of the 1,000 ohms resistance of conventional instruments. Additionally, magnet 27 is a single magnet instead of the conventional two magnets, and is larger so as to give greater magnetic strength and torque. Magnetic shield cup 48 provides for the elimination of one of the magnets in conventional apparatus.

Bendable restoring magnet 41 may be replaced by a non-bendable permanent magnet, and instrument 11 may be calibrated by withdrawing the non-bendable permanent magnet from the case and magnetizing it to the desired strength.

Referring now to the embodiment of the invention shown in Figs. 9-12, there is shown a movement 18a having a support bracket 21a in which is mounted an arbor 26a and a permanent magnet 27a. The view in Fig. 9 is similar to the view in Fig. 5. However, the embodiment of the invention shown in Figs. 9-12 is provided with a restoring magnet nut 51 which has a restoring magnet 52 mounted thereon so that the restoring magnet 52 is freely rotatable in a groove 53 formed in the nut 51.

Nut 51 and magnet 52 threadedly engage upper arbor support stud 54 which is threadedly engaged with bracket 21a. Positioned between bracket 21a and restoring magnet 52 is a zero adjustment member 55 which is provided with a tongue 56, a slot 57, and upwardly extending stop elements 58 which prevent the rotation of restoring magnet 52. A lock nut 61 holds zero adjustment member 55 in place against bracket 21a.

The operation of this embodiment of the invention is as follows. The instrument is zeroed by rotating zero adjustment 55 so that stop elements 58 rotate restoring magnet 52 to the desired position. The instrument is calibrated without disturbing the zero setting by rotating the nut 51 to raise or lower the restoring magnet 52.

It is to be noted that the easy assembling of the instrument, which is accomplished by merely dropping the movement 18 into case 12 and then attaching dial face 13, eliminates all mechanical assembling operations previously required with conventional instruments, and eliminates the use of hand and power tools, and soldering in the case.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. In an electrical measuring instrument having a casing with a flat top and a dial face, and a pendent cup-like portion: a removable self-contained movement fitting into said cup-like portion, said movement comprising an open rectangular bracket having a top bar with projecting ends overlying the flat top of the casing and notches respectively in opposite side edges of its verticals; securing cap screws of which the shanks pass through holes in the projecting ends of the top bar of the bracket and threadedly engage into the top of the casing; an arbor rotatably supported at its opposite ends respectively by pivot screws engaged in tapped apertures centrally of the top and bottom bars of the bracket; a pair of coaxially arranged coils disposed respectively at opposite sides of the arbor, said coils being wound about hollow cores of insulation having lugs at opposite sides thereof engaged in the notches of the bracket; a permanent magnet vane affixed to the arbor in the axis plane of the coils; a pointer affixed to the arbor and adapted to swing over the aforesaid dial face; and a U-shaped spring retaining member having its cross bar resting on the bottom cross bar of the bracket and centrally apertured to clear the bottom pivot screw for the arbor, and said spring member having projections at the tops of its verticals to fit and engage into the outer ends of the insulation cores of the two coils.

2. An electrical measuring instrument according to claim 1, further including a transparent cover engageable over the flat top of the casing; a restoring magnet adjustable about the upper pivot screw for the arbor; and means engaged in the cover whereby the restoring magnet can be adjusted from the exterior.

3. An electrical measuring instrument according to claim 2, wherein the restoring magnet has a slotted arm projection; and wherein the adjusting means in the form of a stud rotatably engaged in the cover and provided with a pendent eccentric pin projection engaged into the slot of the arm of the restoring magnet.

4. In an electrical measuring instrument, a combination zero adjuster and calibration control comprising a support bracket, an arbor support stud threadedly mounted in said bracket, a restoring magnet nut threadedly engaging said stud, a restoring magnet mounted on said nut and freely rotatable thereon, a zero adjustment member positioned around said stud, stop means extending from said zero adjustment member for determining the angular position of said restoring magnet, whereby the instrument may be zeroed by rotating said zero adjustment member which rotates the restoring magnet, and whereby the instrument may be calibrated without disturbing the zero setting by rotating said restoring magnet nut to raise or lower said restoring magnet.

References Cited in the file of this patent

UNITED STATES PATENTS

| | | |
|---|---|---|
| 1,660,285 | Weston | Feb. 21, 1928 |
| 2,102,409 | Faus | Dec. 14, 1937 |
| 2,422,714 | Bigelow | June 24, 1947 |
| 2,547,248 | Bartholomew | Apr. 3, 1951 |
| 2,668,945 | Pfeffer | Feb. 9, 1954 |
| 2,710,377 | Pfeffer | June 7, 1955 |